(12) United States Patent
Kaita

(10) Patent No.: US 8,969,496 B2
(45) Date of Patent: Mar. 3, 2015

(54) METHOD FOR CONTROLLING CHAIN STRUCTURE OF COPOLYMER

(75) Inventor: Shojiro Kaita, Oizumi-machi (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/813,370

(22) PCT Filed: Jul. 22, 2011

(86) PCT No.: PCT/JP2011/004139
§ 371 (c)(1),
(2), (4) Date: Apr. 11, 2013

(87) PCT Pub. No.: WO2012/014420
PCT Pub. Date: Feb. 2, 2012

(65) Prior Publication Data
US 2013/0211032 A1    Aug. 15, 2013

(30) Foreign Application Priority Data

Jul. 30, 2010  (JP) ................................. 2010-173144

(51) Int. Cl.
| | |
|---|---|
| *C08F 4/52* | (2006.01) |
| *C08F 4/72* | (2006.01) |
| *C08F 236/04* | (2006.01) |
| *C08F 210/02* | (2006.01) |
| *C08F 236/06* | (2006.01) |
| *C08F 297/08* | (2006.01) |

(52) U.S. Cl.
CPC ............. *C08F 236/06* (2013.01); *C08F 236/04* (2013.01); *C08F 297/08* (2013.01); *C08F 210/02* (2013.01); *Y10S 526/943* (2013.01)
USPC ............. 526/170; 526/87; 526/133; 526/160; 526/164; 526/339; 526/943; 525/269

(58) Field of Classification Search
USPC ........... 526/87, 339, 133, 160, 164, 170, 943; 525/269
See application file for complete search history.

(56) References Cited

U.S. PATENT DOCUMENTS

| | | | |
|---|---|---|---|
| 4,808,561 A | 2/1989 | Welborn, Jr. | |
| 6,084,046 A * | 7/2000 | Johoji et al. | 526/339 |
| 6,288,191 B1 | 9/2001 | Nishiyama et al. | |
| 6,309,997 B1 | 10/2001 | Fujita et al. | |
| 2004/0077815 A1 | 4/2004 | Abe | |
| 2009/0182104 A1 | 7/2009 | Thuilliez et al. | |

FOREIGN PATENT DOCUMENTS

| | | |
|---|---|---|
| CN | 101274973 A | 10/2008 |
| EP | 2058339 A1 | 5/2009 |
| JP | 1-501633 A | 6/1989 |
| JP | 02-061961 A | 3/1990 |
| JP | 09-255742 A | 9/1997 |
| JP | 11-315119 A | 11/1999 |
| JP | 2002-226533 A | 8/2002 |
| JP | 2004-277721 A | 10/2004 |
| JP | 2006-503141 A | 1/2006 |
| JP | 2006-249442 A | 9/2006 |
| JP | 2008-138093 A | 6/2008 |
| JP | 2009-514911 A | 4/2009 |
| RU | 2348653 C2 | 3/2009 |
| RU | 2008122931 A | 12/2009 |
| RU | 2008122991 A | 12/2009 |
| RU | 2500691 C2 | 12/2013 |
| SU | 309525 A | 9/1971 |
| SU | 383307 A | 6/1974 |
| SU | 504496 A3 | 2/1976 |

OTHER PUBLICATIONS

Machine translation of JP 09-255742A; pub. date: Sep. 1997.*
Machine translation of JP 2004-277721A; pub. date: Oct. 2004.*
International Preliminary Report on Patentability and Written Opinion issued Feb. 5, 2013 in International Application No. PCT/JP2011/004139 to Bridgestone Corporation.
Russian Patent Office, Office Action issued on Jan. 29, 2014 in a counterpart Russian Application No. 2013108956.
Office Action dated Mar. 3, 2014 from the State Intellectual Property Office of P. R. China in a Chinese Application No. 201180047482.0.
Communication dated Jul. 11, 2014, issued by the Russian Patent Office in counterpart Russian Application No. 2013108956.
Japanese Office Action issued on Nov. 11, 2014 from the Japanese Patent Office in Japanese Application No. 2012-526298.
Office Action dated Oct. 24, 2014 from the State Intellectual Property Office of the People's Republic of China in Chinese Application No. 201180047482.0.

* cited by examiner

*Primary Examiner* — Fred M Teskin
(74) *Attorney, Agent, or Firm* — Sughrue Mion, PLLC

(57) ABSTRACT

The present invention provides a method for controlling the chain structure of a copolymer. The disclosed method is capable of controlling the arrangement of monomeric units in a copolymer, and of selectively forming a random copolymer, tapered copolymer, multiblock copolymer and block copolymer. In the method for controlling the chain structure of a copolymer of a conjugated diene compound and a non-conjugated olefin, the introduction of the conjugated diene compound is controlled in the presence of the non-conjugated olefin so as to control the chain structure of the copolymer.

9 Claims, 6 Drawing Sheets

METHOD FOR CONTROLLING CHAIN STRUCTURE OF COPOLYMER

CROSS REFERENCE TO RELATED APPLICATIONS

This application is a National Stage of International Application No. PCT/JP2011/004139 filed Jul. 22, 2011, claiming priority based on Japanese Patent Application No. 2010-173144 filed Jul. 30, 2010, the contents of all of which are incorporated herein by reference in their entirety.

TECHNICAL FIELD

The present invention relates to a method for manufacturing a copolymer of a conjugated diene compound and a non-conjugated olefin, and in particular, to a method for controlling the chain structure of the resulting copolymer that is capable of controlling the arrangement of monomeric units in the copolymer.

BACKGROUND ART

It is well know that coordination anionic polymerization using catalyst systems represented by a Ziegler-Natta catalyst allows for homopolymerization of olefins and dienes. However, it was difficult to provide efficient copolymerization of olefins and dienes using such polymerization reaction systems. For example, while JP 2006-503141A (PTL 1) and JP 2-061961A (PTL 2) refer to copolymerization of ethylenes and dienes, there were many problems associated with the use of a special organic metal complex as a catalytic component, limited structures of the obtained polymer, low catalytic activity, low molecular weight of the generated polymer, and so on.

Meanwhile, if two or more types of monomers are polymerized in the same reaction system, such a copolymer is generated that contains these monomer units as repeating units in one polymer chain. This copolymer is classified into random copolymer, alternating copolymer, block copolymer, graft copolymer, and so on, depending on the arrangement of monomeric units. Among these copolymers, an alternating copolymer is disclosed in, e.g., PTL 1 regarding the method of manufacturing the same. However, no report has been found of methods for manufacturing copolymers having the other chain structures.

CITATION LIST

Patent Literature

PTL 1: JP 2006-503141 A
PTL 2: JP 2-061961 A

SUMMARY OF INVENTION

Technical Problem

Therefore, an object of the present invention is to provide a method for controlling the chain structure of a copolymer that is capable of controlling the arrangement of monomeric units in a copolymer, and of selectively forming a random copolymer, tapered copolymer, multiblock copolymer and block copolymer.

Solution to Problem

The inventor of the present invention has made various studies in order to achieve the above-described object, and as a result, the following findings have been obtained: the arrangement of monomeric units in a copolymer may be controlled by introducing a conjugated diene compound to a polymerization reaction system for polymerizing the conjugated diene compound and a non-conjugated olefin in the presence of the non-conjugated olefin. As a result, the present invention has been accomplished.

That is, the method for controlling the chain structure of the copolymer according to the present invention is a method for controlling the chain structure of a copolymer of a conjugated diene compound and a non-conjugated olefin, wherein the introduction of the conjugated diene compound is controlled in the presence of the non-conjugated olefin so as to control the chain structure of the copolymer.

It should be noted that the introduction of the conjugated diene compound may be performed by using either continuous introduction or separate introduction, or alternatively, by using these methods in combination. For example, continuous introduction means addition being performed at a certain addition rate for a certain period of time.

In a preferred example of the method for controlling the chain structure of a copolymer of the present invention, the conjugated diene compound is preferably a conjugated diene compound having 4 to 8 carbon atoms, and is at least one compound selected from a group consisting of 1,3-butadiene and isoprene.

In another preferred example of the method for controlling the chain structure of a copolymer of the present invention, the non-conjugated olefin is acyclic olefin. In this case, the acyclic olefin is preferably an α-olefin having 2 to 10 carbon atoms, which α-olefin preferably includes ethylene, propylene and 1-butene.

Preferably, in the method for controlling the chain structure of the copolymer of the present invention, the amount of the conjugated diene compound to be introduced is controlled so as to control the chain structure of the copolymer.

Preferably, in the method for controlling the chain structure of the copolymer of the present invention, the number of times the conjugated diene compound is introduced is controlled so as to control the chain structure of a copolymer.

Advantageous Effect of Invention

According to the present invention, in the case of polymerizing a conjugated diene compound and a non-conjugated olefin by introducing a conjugated diene compound to a polymerization reaction system, the introduction of the conjugated diene compound may be controlled in the presence of the non-conjugated olefin to thereby control the arrangement of monomeric units in the copolymer and selectively form a random copolymer, tapered copolymer, multiblock copolymer and block copolymer.

BRIEF DESCRIPTION OF DRAWINGS

The present invention will be further described below with reference to the accompanying drawings, wherein.

DESCRIPTION OF EMBODIMENTS

Figure 1:
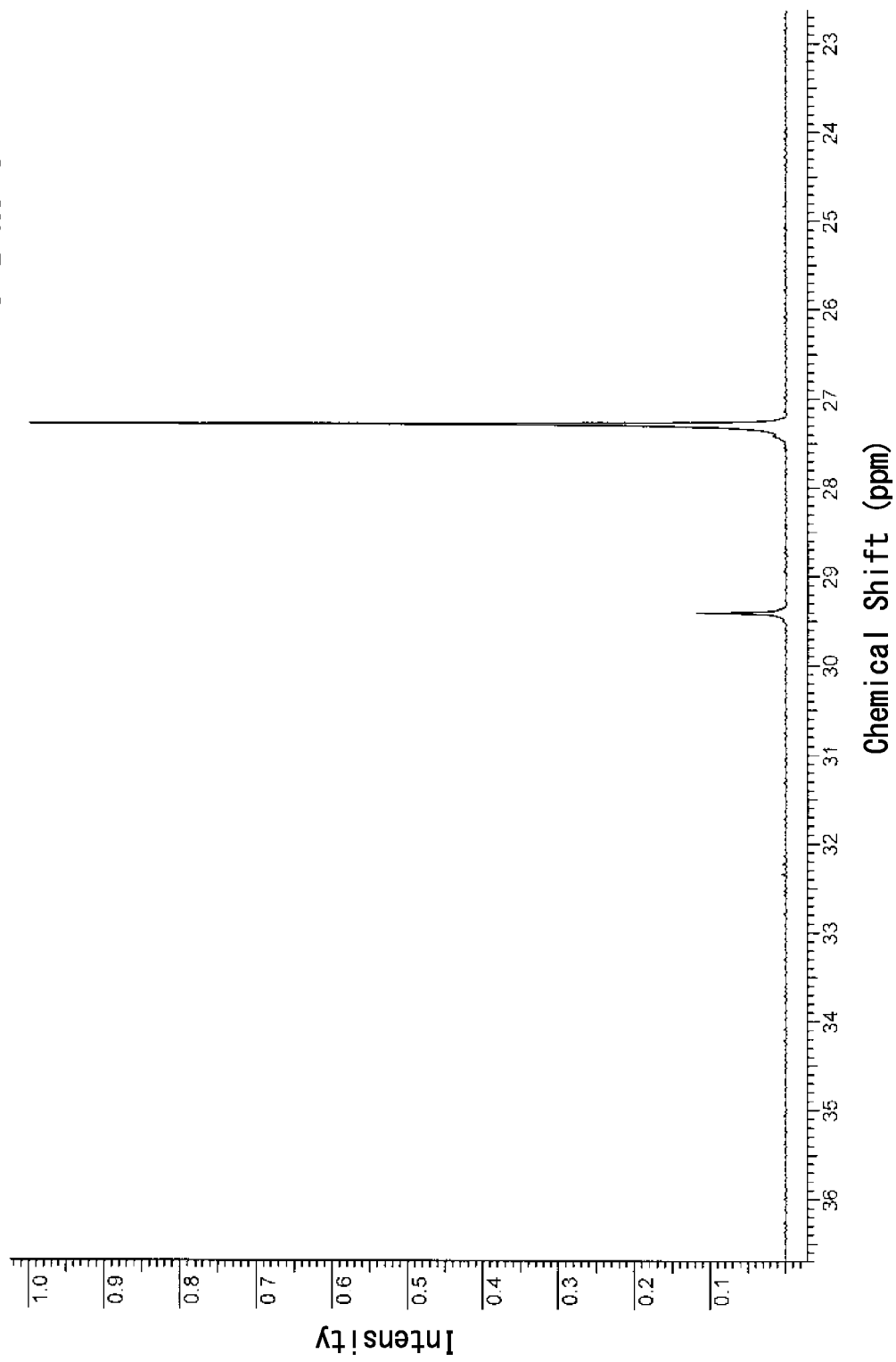
FIG. 1 is a $^{13}$C-NMR spectrum chart of a copolymer A.

The present invention will be described in detail below. The method for controlling the chain structure of the copolymer according to the present invention is a method for controlling the chain structure of a copolymer of a conjugated diene compound and a non-conjugated olefin, wherein the introduction of the conjugated diene compound is controlled in the presence of the non-conjugated olefin so as to control the chain structure of the copolymer. As described above, in conventional polymerization reaction systems, there are little reports on the arrangement of monomeric units in copolymers. As such, the inventor of the present invention focused on how to load monomers in a polymerization reaction system, and as a result, obtained a finding that the arrangement of monomeric units in a copolymer may be controlled by providing a non-conjugated olefin in the polymerization reaction system at the time of introducing a conjugated diene compound. Accordingly, the method for controlling the chain structure of a copolymer of the present invention allows for selective formation of random copolymer, tapered copolymer, multiblock copolymer and block copolymer. As used herein, the term "polymerization reaction system" indicates a place where polymerization of a conjugated diene compound and a non-conjugated olefin occurs; the specific examples include a reactor, and so on.

Specifically, introducing a conjugated diene compound into a polymerization system for copolymerizing the conjugated diene compound and a non-conjugated olefin allows control of the concentration ratio of monomers in the polymerization system, with the result that the chain structure (that is, the arrangement of monomer units) in the copolymer to be obtained can be defined. Further, a conjugated diene compound is introduced in the presence of a non-conjugated olefin in the polymerization system, to thereby suppress generation of homopolymer of a conjugated diene compound. The polymerization of a non-conjugated olefin may be started prior to the introduction of a conjugated diene compound.

For example, if a block copolymer is manufactured by using the method for controlling the chain structure of the copolymer according to the present invention, it is effective to continuously introduce a conjugated diene compound in the presence of a non-conjugated olefin into the polymerization reaction system in which polymerization of the non-conjugated olefin has been initiated in advance. Alternatively, if a multiblock copolymer is manufactured, block copolymers may be manufactured repeatedly.

In addition, if a tapered copolymer is manufactured by using the method for controlling the chain structure of the copolymer according to the present invention, it is effective to use both methods of manufacturing a block copolymer and of a random copolymer. Specifically, the following methods can be exemplified: (1) a method comprising: introducing a conjugated diene compound to a polymerization system in which the polymerization of a non-conjugated olefin is started in advance, in the presence of a non-conjugated olefin; and newly introducing a conjugated diene compound at least once and/or continuously into the polymerization system which includes a copolymer resulting from the polymerization of a non-conjugated olefin and a conjugated diene compound; (2) a method comprising: introducing a conjugated diene compound at least once or continuously in the presence of a non-conjugated olefin; and then continuously introducing a conjugated diene compound into the polymerization system including a copolymer resulting from the polymerization of a non-conjugated olefin and a conjugated diene compound. Further, these methods can both be employed in combination for polymerization to synthesize a tapered copolymer.

Further, if a random copolymer is manufactured by using the method for controlling the chain structure of the copolymer according to the present invention, it is effective to further introduce, in the presence of a non-conjugated olefin, a conjugated diene compound one or more times into a polymerization reaction system in which polymerization of the conjugated diene compound and the non-conjugated olefin has been initiated, or to continuously introduce, in the presence of a non-conjugated olefin, a conjugated diene compound into a polymerization reaction system for polymerizing the conjugated diene compound and the non-conjugated olefin.

As used herein, the term "block copolymer" means a copolymer comprising: a block sequence having a monomeric unit of a conjugated diene compound; and a block sequence having a monomeric unit of a non-conjugated olefin, including a multiblock copolymer (block copolymers having multiple (A-B) or (B-A) structures, provided that these copolymers have $(A-B)_x$, $A-(B-A)_x$ and $B-(A-B)_x$ structures). In addition, as used herein, the term "tapered copolymer" means a copolymer comprising: at least one of a block sequence having a monomeric unit of a conjugated diene compound and a block sequence having a monomeric unit of a non-conjugated olefin; and random moieties in which monomeric units of a conjugated diene compound and a non-conjugated olefin are irregularly arranged, and the term "random copolymer" means a copolymer comprising random moieties in which monomeric units of a conjugated diene compound and a non-conjugated olefin are irregularly arranged.

Regarding the copolymer obtained by using the method for controlling the chain structure of the copolymer according to the present invention, Differential Scanning calorimetry (DSC) and Nuclear Magnetic Resonance (NMR) are used as major measuring means for determining whether a block copolymers, tapered copolymer and random copolymer are formed.

It should be noted that Differential Scanning calorimetry (DSC) is a measuring method that is conducted under the standard JIS K7121-1987. Specifically, if a glass transition point resulting from the homopolymerization of a conjugated diene compound and a crystallization temperature resulting from the homopolymerization of a non-conjugated olefin are observed with DSC, this indicates that a block sequence having a monomeric unit of the conjugated diene compound and a block sequence having a monomeric unit of the non-conjugated olefin are formed in that copolymer. In addition, if no crystallization temperature resulting from the homopolymerization of the non-conjugated olefin is observed with DSC, or if there is observed a wider peak than that of the crystallization temperature resulting from the homopolymerization of the non-conjugated olefin, this indicates that random moieties in which monomeric units of the conjugated diene compound and the non-conjugated olefin are irregularly arranged is formed in that copolymer.

The method for controlling the chain structure of the copolymer according to the present invention is not specifically limited as long as the introduction of monomers into a polymerization system is specified as described above, and may employ any polymerization method including, for example, solution polymerization, suspension polymerization, liquid phase bulk polymerization, emulsion polymerization, vapor phase polymerization, and solid state polymerization.

In the method for controlling the chain structure of the copolymer according to the present invention, a conjugated diene compound used as a monomer is preferably a conjugated diene compound having 4 to 8 carbon atoms, including, specifically, 1,3-butadiene, isoprene, 1,3-pentadiene, 2,3-dimethylbutadiene, and so on; among these, preferred are 1,3-butadiene and isoprene. In addition, these conjugated diene compounds may be contained alone or in combination of two or more.

In the method for controlling the chain structure of the copolymer according to the present invention, the introduction of a conjugated diene compound needs to be controlled. Specifically, it is preferred to control the amount of the conjugated diene compound to be introduced and the number of times the conjugated diene compound is introduced. Examples of the method of controlling the introduction of the conjugated diene compound may include, but not limited to: a controlling method based on a computer program or the like; and an analog control method with the use of a timer or the like. Further, as described above, the method of introducing a conjugated diene compound is not specifically limited, and may be exemplified by continuous introduction or divisional introduction. Here, in divisionally introducing a conjugated diene compound, the number of times the conjugated diene is introduced is not specifically limited.

On the other hand, the non-conjugated olefin used as a monomer is preferably an acyclic olefin, which is preferably an α-olefin having 2 to 10 carbon atoms. In this case, examples of the above-described α-olefin include ethylene, propylene, 1-butene, 1-pentene, 1-hexene, 1-heptene, 1-octene, and so on; among these, preferred are ethylene, propylene and 1-butene. These non-conjugated olefins may be contained alone or in combination of two or more. It should be noted that olefins are unsaturated aliphatic hydrocarbons, which are compounds having one or more carbon-carbon double bonds.

Further, the method for controlling the chain structure of the copolymer according to the present invention requires the presence of a non-conjugated olefin upon introduction of a conjugated diene compound, and thus it is preferred to continuously feed a non-conjugated olefin to the polymerization system. Here, how to feed the non-conjugated olefin is not specifically limited.

According to the method for controlling the chain structure of a copolymer of the present invention, it is preferred to polymerize a conjugated diene compound and a non-conjugated olefin in the presence of the following polymerization catalyst or polymerization catalyst composition, in view of efficiently enhancing the polymerization. In the case of using a solvent for polymerization, any solvent that is inactive in polymerization can be used, including, for example, toluene and so on.

<First Polymerization Catalyst Composition>

An example of the aforementioned polymerization catalyst composition preferably includes a polymerization catalyst composition (hereinafter, also referred to as first polymerization catalyst composition) including at least one complex selected from a group consisting of: a metallocene complex represented by the following general formula (I); a metallocene complex represented by the following general formula (II); and a half metallocene cation complex represented by the following general formula (III):

[Formula 1]

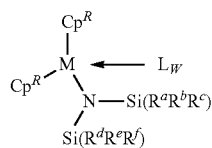

(I)

(In the formula (I), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; and w represents an integer of 0 to 3.);

[Formula 2]

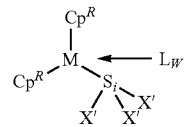

(II)

(In the formula (II), M represents a lanthanoid element, scandium, or yttrium; $Cp^R$ each independently represents an unsubstituted or substituted indenyl group; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3.); and

[Formula 3]

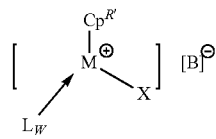

(III)

(In the formula (III), M represents a lanthanoid element, scandium, or yttrium; $Cp^{R'}$ each independently represents an unsubstituted or substituted cyclopentadienyl, indenyl, fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]$^-$ represents a non-coordinating anion.) The first polymerization catalyst composition may further include another component such as a co-catalyst, which is contained in a general polymerization catalyst composition containing a metallocene complex. Here, the metallocene complex is a complex compound having one or more cyclopentadienyl groups or derivative of cyclopentadienyl groups bonded to the central metal. In particular, a metallocene complex may be referred to as half metallocene complex when the number of cyclopentadienyl group or derivative thereof bonded to the central metal is one.

In the polymerization system, the concentration of the complex contained in the first polymerization catalyst composition is preferably defined to fall within a range of 0.1 mol/L to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. Specific examples of the substituted indenyl group include 2-phenyl indenyl, 2-methyl indenyl, and 1-methyl-2-phenyl indenyl group. Two $Cp^R$ in the general formulae (I) and (II) may be the same as or different from each other.

In the half metallocene cation complex represented by the general formula (III), $Cp^{R'}$ in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a propyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is specifically exemplified as follows.

[Formula 4]

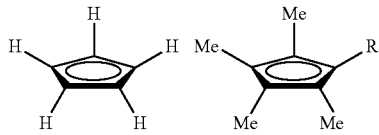

(In the formula, R represents a hydrogen atom, a methyl group, or an ethyl group.)

In the general formula (III), $Cp^{R'}$ having an indenyl ring as a basic skeleton is defined as the same as $Cp^R$ in the general formula (I), and preferred examples thereof are also the same as those of $Cp^R$ in the general formula (I).

In the general formula (III), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. R independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (I), (II), and (III) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—N(SiR$_3$)$_2$]. Groups represented by R ($R^a$ to $R^f$ in the general formula (I)) in the silyl amide ligand each independently represent a hydrogen atom or an alkyl group having 1 to 3 carbon atoms, and it is preferred that at least one of $R^a$ to $R^f$ represents a hydrogen atom. With at least one of $R^a$ to $R^f$ representing a hydrogen atom, the catalyst can be synthesized with ease, and the height around silicon can be reduced, to thereby allow the non-conjugated olefin to be easily introduced. Based on the same objective, it is further preferred that at least one of $R^a$ to $R^c$ represents a hydrogen atom, and at least one of $R^d$ to $R^f$ represents a hydrogen atom. A methyl group is preferred as the alkyl group.

The metallocene complex represented by the general formula (II) includes a silyl ligand represented by [—SiX'$_3$]. X' in the silyl ligand represented by [—SiX'$_3$] is a group defined as the same as X in the general formula (III) described below, and preferred examples thereof are also the same as those of X in the general formula (III).

In the general formula (III), X represents a group selected from a group consisting of a hydrogen atom, a halogen atom, an alkoxide group, a thiolate group, an amide group, a silyl group, and a hydrocarbon group having 1 to 20 carbon atoms. In the general formula (III), the alkoxide group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group, with the bistrimethylsilyl amide group being preferred.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group, with the tris(trimethylsilyl)silyl group being preferred.

In the general formula (III), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom, with the methyl group, the ethyl group, the isobutyl group, the trimethylsilylmethyl group, and the like being preferred.

In the general formula (III), the bistrimethylsilyl amide group and the hydrocarbon group having 1 to 20 carbon atoms are preferred as X.

In the general formula (III), examples of the non-coordinating anion represented by [B]⁻ include tetravalent boron anions. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and tridecahydride-7,8-dicarbaundecaborate, with the tetrakis(pentafluorophenyl)borate being preferred.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

The metallocene complexes represented by the general formulae (I) to (II), and the half metallocene cation complex represented by the general formula (III) may be each present as a monomer or as a dimer or a multimer having more monomers.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl) amide (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (I) is described.

[Formula 5]

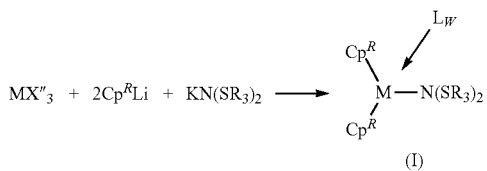

(I)

(In the Formula, X" represents a halide.)

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (II) is described.

[Formula 6]

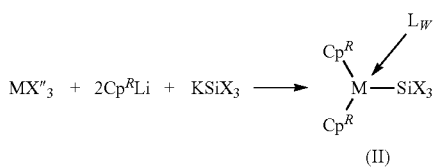

(II)

(In the Formula, X" represents a halide.)

The half metallocene cation complex represented by the general formula (III) can be obtained by, for example, the following reaction:

[Formula 7]

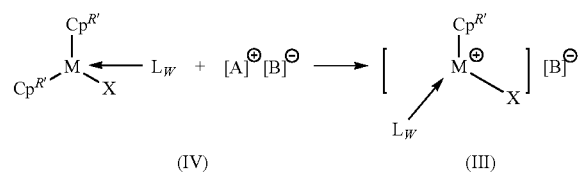

In the general formula (IV) representing a compound: M represents a lanthanoid element, scandium, or yttrium; $Cp^{R'}$ independently represents an unsubstituted or substituted cyclopentadienyl, indenyl, or fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. Further, in the general formula [A]⁺[B]⁻ representing an ionic compound, [A]⁺ represents a cation; and [B]⁻ represents a non-coordinating anion.

Examples of the cation represented by [A]⁺ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl) carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri (dimethylphenyl)phosphonium cation. Of those cations, the N,N-dialkylanilinium cations or the carbonium cations are preferred, and the N,N-dialkylanilinium cations are particularly preferred.

In the general formula [A]$^+$[B]$^-$ representing the ionic compound to be used in the above reaction is a compound obtained by combining any one selected from the non-coordinating anions described above and any one selected from the cations described above. Preferred examples thereof include N,N-dimethylanilinium tetrakis(pentafluorophenyl) borate and triphenylcarbonium tetrakis(pentafluorophenyl) borate. The ionic compound represented by the general formula [A]$^+$[B]$^-$ is added in an amount of preferably 0.1-fold mol to 10-fold mol and more preferably about 1-fold mol, with respect to the metallocene complex. When the half metallocene cation complex represented by the general formula (III) is used in polymerization reaction, the half metallocene cation complex represented by the general formula (III) may be directly supplied to the polymerization system, or alternatively, the compound represented by the general formula (IV) and the ionic compound represented by the general formula [A]$^+$[B]$^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula [A]$^+$[B]$^-$ in combination.

Structures of the metallocene complex represented by the general formula (I) or (II) and of the half metallocene cation complex represented by the general formula (III) is preferably determined by X-ray crystallography.

The co-catalyst that can be contained in the first polymerization catalyst composition may be arbitrarily selected from components used as the co-catalyst for the general polymerization catalyst composition containing a metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane. Examples of the alkyl aluminoxane include methyl aluminoxane (MAO) and modified methyl aluminoxanes. In addition, preferred examples of the modified methyl aluminoxane include MMAO-3A (manufactured by Tosoh Finechem Corporation). A content of the aluminoxane in the first polymerization catalyst composition is preferably about 10 to 1,000, more preferably about 100, at an element ratio (Al/M) of the aluminum element Al of the aluminoxane to the central metal element M in the metallocene complex.

On the other hand, examples of the organic aluminum compound include a trialkyl aluminum, a dialkyl aluminum chloride, an alkyl aluminum dichloride, and a dialkyl aluminum hydride, with the trialkyl aluminum being preferred. In addition, examples of the trialkyl aluminum include triethyl aluminum and triisobutyl aluminum. A content of the organic aluminum compound in the first polymerization catalyst composition is preferably 1-fold mol to 50-fold mol and more preferably about 10-fold mol, with respect to the metallocene complex.

In the first polymerization catalyst composition, the metallocene complex represented by the general formulae (I) and (II) and the half metallocene complex represented by the general formula (III) may be combined with an appropriate co-catalyst, to thereby increase the cis-1,4 bond content and the molecular weight of a copolymer to be obtained.

<Second Polymerization Catalyst Composition>

Another preferred example of the aforementioned polymerization catalyst composition may include:

a polymerization catalyst composition (hereinafter, also referred to as second polymerization catalyst composition) containing:

component (A): a rare earth element compound or a reactant of a rare earth element compound and a Lewis base, with no bond formed between the rare earth element and carbon;

component (B): at least one selected from a group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen. Further, if the polymerization catalyst composition contains at least one kind of the ionic compound (B-1) and the halogen compound (B-3), the polymerization catalyst composition further contains:

component (C): an organic metal compound represented by the following general formula (I):

YR$^1_a$R$^2_b$R$^3_c$ (i)

(where Y is a metal selected from Group 1, Group 2, Group 12, and Group 13 of the periodic table; R$^1$ and R$^2$ are the same or different hydrocarbon groups each having 1 to 10 carbon atoms or a hydrogen atom; and R$^3$ is a hydrocarbon group having 1 to 10 carbon atoms, in which R$^3$ may be the same as or different from R$^1$ or R$^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table). The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the second polymerization catalyst composition may further include another component such as a co-catalyst, which is contained in a general rare earth element compound-based polymerization catalyst composition. In the polymerization system, the concentration of the component (A) contained in the second polymerization catalyst composition is preferably defined to fall within a range of 0.1 mol/L to 0.0001 mol/L.

The component (A) contained in the second polymerization catalyst composition is a rare earth element compound or a reactant of the rare earth element compound and a Lewis base. Here, a rare earth element compound or a reactant of the rare earth element compound and a Lewis base do not have a direct bond of the rare earth element and carbon. When the rare earth element compound or a reactant thereof does not have a direct bond of a rare earth element and carbon, the resulting compound is stable and easy to handle. Here, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbio, tulio, itterbio, and lutezio. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

$$M^{11}X^{11}{}_2 \cdot L^{11}{}_w \qquad (XI)$$

$$M^{11}X^{11}{}_3 \cdot L^{11}{}_w \qquad (XII)$$

(where: $M^{11}$ represents a lanthanoid element, scandium, or yttrium; $X^{11}$ each independently represent a hydrogen atom, a halogen atom, an alkoxy group, a thiolate group, an amide group, a silyl group, an aldehyde residue, a ketone residue, a carboxylic acid residue, a thicarboxylic acid residue, or a phosphorous compound residue; $L^{11}$ represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; aromatic alkoxy groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bis-trialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid (butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, a and phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl) phosphinic acid, (2-ethylhexyl)(2-methylhexyl)(1-methylheptyl)phosphinic acid, an (2-ethylhexyl)(p-nonylphenyl) phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more. Of those, amide groups are preferably used because they easily form active species through reaction with co-catalyst.

As to the component (A) used in the second polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII)), the Lewis base $L^{11}$ in each Formula may be the same as or different from each other.

The component (B) contained in the second polymerization catalyst composition is at least one compound selected from a group consisting of: an ionic compound (B-1); an aluminoxane (B-2); and a halogen compound (B-3). The total content of the component (B) contained in the second polymerization catalyst composition is preferably defined to fall within a range of 0.1-fold mol to 50-fold mol, with respect to the component (A).

The ionic compound represented by (B-1) is formed of non-coordinating anion and cation, and an example thereof includes: an ionic compound that reacts with the rare earth element compound as the component (A) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis (difluorophenyl)borate, tetrakis(trifluorophenyl)borate, tetrakis(tetrafluorophenyl)borate, tetrakis(pentafluorophenyl) borate, tetrakis(tetrafluoromethylphenyl)borate, tetra(tolyl) borate, tetra(xylyl)borate, (tripheyl, pentafluorophenyl) borate, [tris(pentafluorophenyl), phenyl]borate, and tridecahydride-7,8-dicarbaundecaborate.

Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri (dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. These ionic compounds may be contained alone or in combination of two or more. The content of the ionic compound in the second polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R') O—) (where R' is a hydrocarbon group having 1 to 10 carbon atoms and may be partly substituted with halogen atom and/ or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the second polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form compounds such as a halogenated transition metal compound or a compound with a charge-deficient transition metal center. The content of the halogen compound in the second polymerization catalyst composition is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride, with the diethyl aluminum chloride, the ethyl aluminum sesquichloride, the ethyl aluminum dichloride, the diethyl aluminum bromide, the ethyl aluminum sesquibromide, and the ethyl aluminum dibromide being particularly preferred.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper bromide; a copper iodide; a silver chloride; a silver bromide; a silver iodide; a gold chloride; a gold iodide; and a gold bromide, with the magnesium chloride, the calcium chloride, the barium chloride, the manganese chloride, the zinc chloride, and the copper chloride being preferred, and the magnesium chloride, the manganese chloride, the zinc chloride, and the copper chloride being particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol, with the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol being preferred.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (C) that may be contained in the second polymerization catalyst composition is an organic compound represented by the general formula (I):

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table), and is preferably an organic aluminum compound represented by the general formula (X):

(where $R^{11}$ and $R^{12}$ are the same or different hydrocarbon groups each having 1 to 10 carbon atoms or a hydrogen atom; and $R^{13}$ is a hydrocarbon group having 1 to 10 carbon atoms, in which $R^{13}$ may be the same as or different from $R^{11}$ or $R^{12}$ above). Examples of the organic aluminum compound in the formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic metal compounds as the component (C) may be contained alone or in combination of two or more. The content of the organic aluminum compound in the second polymerization catalyst composition is preferably 1-fold mol to 50-fold mol with respect to the component (A).

<Polymerization Catalyst>

Examples of the polymerization catalyst suitably include: a metallocene-based composite catalyst represented by the following formula (A):

(where R each independently represents an unsubstituted or substituted indenyl group, the R being coordinated with M; M represents a lanthanoid element, scandium, or yttrium; X each independently represents a hydrocarbon group having 1 to 20 carbon atoms, the X being µ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2), and more preferably include a metallocene-based composite catalyst represented by the following general formula (XX):

[Formula 8]

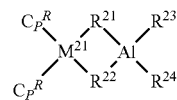

(where $M^{21}$ represents a lanthanoid element, scandium, or yttrium; $Cp^R$ each independently represents an unsubstituted or substituted indenyl group; $R^{21}$ to $R^{22}$ each independently represent a hydrocarbon group having 1 to 20 carbon atoms, the $R^{21}$ and $R^{22}$ being µ-coordinated with $M^{21}$ and Al; and $R^{23}$ and $R^{24}$ each independently represent a hydrocarbon group having 1 to 20 carbon atoms or a hydrogen atom). Here, the metallocene-based composite catalyst is a compound having: a rare earth element such as lanthanoid element, scandium, or yttrium; and a Group 13 element in the periodic table. The use of these metallocene-based composite compounds such as an aluminum-based catalyst can reduce or eliminate the amount of alkyl aluminum to be used in the step of synthesizing a copolymer. Meanwhile, the use of a conventional catalyst system requires a large amount of alkyl aluminum to be used in synthesizing a copolymer. For example, a conventional catalyst system requires alkyl aluminum of at least 10 equivalents relative to a metal catalyst, whereas the metallocene-based composite catalyst of the present invention can exhibit an excellent catalytic effect through the addition of alkyl aluminum of only about 5 equivalents.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include: boron, aluminum, gallium, indium, and thallium.

In the formula (A), X each independently represents a hydrocarbon group having 1 to 20 carbon atoms, the X being µ-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (A), Y each independently represents a hydrocarbon group having 1 to 20 carbon atoms or a hydrogen atom, the Y being coordinated with Q. Here, examples of the hydrocarbon group having 1 to 20 carbon atoms include, a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

On the other hand, in the metallocene-based composite catalyst represented by the formula (XX), the metal represented by $M^{21}$ in the formula (XX) is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (XX), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Specific examples of the hydrocarbyl group suitably include a methyl group, an ethyl group, a phenyl group, and a benzyl group. Meanwhile, examples of metalloid in the metalloid group include germyl (Ge), stannyl (Sn), and silyl (Si). In addition, the metalloid group preferably has a hydrocarbyl group, which is similar to the hydrocarbyl group described above. A specific example of the metalloid group is a trimethylsilyl group. Specific examples of the substituted indenyl group include 2-phenyl indenyl and 2-methyl indenyl group. Two $Cp^R$ in the formula (XX) may be the same as or different from each other.

In the formula (XX), $R^{21}$ and $R^{22}$ each independently represent a hydrocarbon group having 1 to 20 carbon atoms, the $R^{21}$ and $R^{22}$ being μ-coordinated with $M^{21}$ and Al. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (XX), $R^{23}$ and $R^{24}$ each independently represent a hydrocarbon group having 1 to 20 carbon atoms or a hydrogen atom. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting with an organic aluminum compound represented by $AlR^{25}R^{26}R^{27}$ in a solvent, the metallocene complex represented by the formula (I) described in the first polymerization catalyst composition. The reaction may be carried out at temperatures around room temperature, and thus the metallocene-based composite catalyst can be manufactured under mild conditions. The reaction time is arbitrary, and may be about several hours to several tens of hours. The reaction solvent is not particularly limited, and any solvent including, for example, toluene and hexane, which are capable of dissolving the raw material and the product can be preferably used. The structure of the metallocene-based composite catalyst may preferably be determined by X-ray crystallography.

The organic aluminum compound is represented by $AlR^{25}R^{26}R^{27}$, where $R^{25}$ and $R^{26}$ each independently represents a univalent hydrocarbon group having 1 to 20 carbon atoms or a hydrogen atom, and $R^{27}$ is a univalent hydrocarbon group having 1 to 20 carbon atoms and may be identical to or different from $R^{25}$ or $R^{26}$. Examples of the univalent hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. In addition, specific examples of the organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. These organic aluminum compounds may be contained alone or in combination of two or more. The content of the organic aluminum compound to be used for generating the metallocene-based composite catalyst is preferably 2-fold mol to 50-fold mol, and more preferably about 3-fold mol to 10-fold mol, with respect to the metallocene complex.

<Third Polymerization Catalyst Composition>

Preferred examples of the polymerization catalyst composition may further include a copolymerization compound including the metallocene-based composite catalyst and boron anion (hereinafter, the polymerization catalyst composition is also referred to as third polymerization catalyst composition). The third polymerization catalyst composition may further include another component such as a co-catalyst, which is contained in a general polymerization catalyst composition containing a metallocene complex. Here, the third polymerization catalyst composition is also referred to two-component catalyst, which has the metallocene-based composite catalyst and boron anion. The third polymerization catalyst composition is capable of producing, similarly to the metallocene-based composite catalyst, a copolymer of a conjugated diene compound and a non-conjugated olefin. In addition, the third polymerization catalyst composition further contains boron anion, which allows the content of each monomer component in the copolymer to be arbitrarily controlled.

In the third polymerization catalyst composition, a specific example of the boron anion forming the two-component catalyst includes a tetravalent boron anion. Examples thereof may include: a tetraphenyl borate, a tetrakis(monofluorophenyl) borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (tripheyl, pentafluorophenyl)borate, a [tris(pentafluorophenyl), phenyl]borate, and a tridecahydride-7,8-dicarbaundecaborate, with the tetrakis(pentafluorophenyl)borate being preferred.

The boron anion may be used as an ionic compound combined with cation. Examples of the cation include a carbonium cation, an oxonium cation, an ammonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and more specifically, an example of the tri(substituted phenyl)carbonium cation includes a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis(pentafluorophenyl)borate. The content of the ionic compound including a boron anion and a cation may preferably be added by 0.1-fold mol to 10-fold mol, and more preferably by about 1-fold mol, with respect to the metallocene-based composite catalyst.

Preferred examples of the co-catalyst that can be contained in the third polymerization catalyst composition may include an organic aluminum compound represented by the AlR$^{25}$R$^{26}$R$^{27}$, and also include aluminoxanes. The aluminoxane is preferably an alkyl aluminoxane. Examples of the alkyl aluminoxane include methyl aluminoxane (MAO) and modified methyl aluminoxanes. In addition, preferred examples of the modified methyl aluminoxane include MMAO-3A (manufactured by Tosoh Finechem Corporation). The aluminoxanes may be contained alone or in combination of two or more.

In the case of using the polymerization catalyst or the polymerization catalyst composition described above in a method of controlling the chain structure of the copolymer according to the present invention, the method may be carried out similarly to a conventional method of manufacturing a copolymer through polymerization reaction using the coordination ion polymerization catalyst. Here, in the case of carrying out the method of controlling the chain structure of the copolymer of the present invention using the polymerization catalyst composition, the method can be performed in either one of the following manners. That is, for example, (1) the components forming the polymerization catalyst composition may be separately provided in the polymerization reaction system including, as monomers, a conjugated diene compound and a conjugated olefin, to thereby prepare the polymerization catalyst composition in the reaction system, or (2) the polymerization catalyst composition prepared in advance may be provided into the polymerization reaction system. Further, the method of (2) also includes providing the metallocene complex (active species) activated by the co-catalyst. The amount of the metallocene complex to be contained in the polymerization catalyst composition is preferably set to fall within a range of 0.0001-fold mol to 0.01-fold mol with respect to the total amount of the conjugate diene compound and the non-conjugated olefin.

Further, in the method of controlling the chain structure of the copolymer according to the present invention, a terminator such as ethanol and isopropanol may be used to stop the polymerization.

Further, the polymerization reaction may preferably be performed in an inert gas atmosphere, and preferably in nitrogen or argon atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10 MPa so as to allow a conjugated diene compound and a non-conjugated olefin to be sufficiently introduced into the polymerization system. Further, the reaction time of the polymerization reaction is not particularly limited, and may preferably be in a range of, for example, 1 second to 10 days, which may be selected as appropriate depending on the conditions such as the type of the monomers to be polymerized, the type of the catalyst, and the polymerization temperature.

According to the method of controlling the chain structure of the copolymer of the present invention, in polymerizing a conjugated diene compound and a non-conjugated olefin, the concentration of the conjugated diene compound (mol/L) and the concentration of the non-conjugated olefin (mol/L) at the start of copolymerization preferably satisfy the following relation:

the concentration of the non-conjugated olefin/the concentration of
the conjugated diene compound $\geq 1.0$;
further preferably satisfy the following relation:
the concentration of the non-conjugated olefin/the concentration of
the conjugated diene compound $\geq 1.3$; and
still further preferably satisfy the following relation:
the concentration of the non-conjugated olefin/the concentration of
the conjugated diene compound $\geq 1.7$.

The ratio of the concentration of the non-conjugated olefin to the concentration of the conjugated diene compound is defined to be at least 1, to thereby efficiently introduce the non-conjugated olefin into the reaction mixture.

In addition, the conjugated diene compound/non-conjugated olefin copolymer obtained by the method for controlling the chain structure of the copolymer according to the present invention neither suffer from molecular weight reduction, nor is limited to any particular weight average molecular weight (Mw). However, from the viewpoint of application to materials with polymeric structure, this copolymer preferably has a weight average molecular weight (Mw) of 25,000 or more, more preferably 50,000 to 500,000. Further, this copolymer preferably has a molecular weight distribution (Mw/Mn) of 4 or less, more preferably 2.5 or less, which is represented by a ratio of weight average molecular weight (Mw) to number average molecular weight (Mn). It should be noted here that the average molecular weigh and the molecular weight distribution may be determined through gel permeation chromatography (GPC) using polystyrene as a reference.

The conjugated diene compound/non-conjugated olefin copolymer obtained by the method for controlling the chain structure of the copolymer according to the present invention has a high cis-1,4 bond content in the conjugated diene compound unit thereof. In this case, the above-described conjugated diene compound unit preferably has a cis-1,4 bond content of 85% or more. If the conjugated diene compound unit has a cis-1,4 bond content of 85% or more, it is possible to maintain high elongation-induced crystallization ability and a low glass transition point (Tg), thereby improving physical properties, such as abrasion resistance. In addition, if the conjugated diene compound unit has a cis-1,4 bond content of less than 85%, the elongation-induced crystallization ability is significantly impaired and the glass transition point (Tg) becomes higher, which may result in a reduction in durability, such as abrasion resistance.

The conjugated diene compound/non-conjugated olefin copolymer obtained by the method for controlling the chain structure of the copolymer according to the present invention preferably has a vinyl bond content of 20% or less, more preferably 15% or less, in the conjugated diene compound unit thereof. If the conjugated diene compound unit has a vinyl bond content of greater than 20%, it has a lower cis-1,4 bond content, which makes it impossible to obtain a sufficient abrasion resistance improving effect.

The conjugated diene compound/non-conjugated olefin copolymer obtained by the method for controlling the chain structure of the copolymer according to the present invention preferably contains 3 to 98 mol %, more preferably 10 to 50 mol %, of the non-conjugated olefin. If the content of the non-conjugated olefin is within the above-specified range, such an advantage is preserved that is obtained by introducing the non-conjugated olefin having an effect of improving heat resistance and uniformly acting as an elastomer into the main chain. In addition, if the content of the non-conjugated olefin is below 3 mol %, the advantage obtained by introducing the non-conjugated olefin into the main chain may be lost, whereas above 98 mol %, the advantage obtained by introducing the conjugated diene compound into the main chain (e.g., cross-linkability) may be lost.

The conjugated diene compound/non-conjugated olefin copolymer obtained by the method for controlling the chain structure of the copolymer according to the present invention may be generally used for elastomer products, particularly tire members.

EXAMPLES

In the following, the invention of the present invention is described with reference to Examples. However, the present invention is no way limited to the following Examples.

Example 1

Firstly, 160 mL of a toluene solution was added to a 400 mL pressure-resistant grass reactor that had been sufficiently dried, and then ethylene was introduced thereto at 0.8 MPa. Meanwhile, in a glovebox under a nitrogen atmosphere, 28.5 µmol of bis(2-phenylindenyl)gadolinium bis(dimethylsilylamide) [(2-PhC$_9$H$_6$)$_2$GdN(SiHMe$_2$)$_2$], 34.2 µmol of dimethylanilinium tetrakis(pentafluorophenyl)borate [Me$_2$NHPhB(C$_6$F$_5$)$_4$], and 1.43 mmol of diisobutylaluminum hydride were provided in a glass container, which was dissolved into 8 mL of toluene, to thereby obtain a catalyst solution. After that, the catalyst solution was taken out from the glovebox and added by 28.2 µmol of gadolinium equivalent to the monomer solution, which was then subjected to polymerization at room temperature for 5 minutes. Thereafter, 100 mL of a toluene solution containing 15.23 g (0.28 mol) of 1,3-butadiene was added while reducing the introduction pressure of ethylene at a rate of 0.2 MPa/min, and then polymerization was further performed for another 90 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer A (block copolymer). The yield of the copolymer A thus obtained was 12.50 g.

Example 2

Firstly, 100 mL of a toluene solution was added to a 400 mL pressure-resistant grass reactor that had been sufficiently dried, and then ethylene was introduced thereto at 0.8 MPa. Meanwhile, in a glovebox under a nitrogen atmosphere, 28.5 µmol of bis(2-phenylindenyl)gadolinium bis(dimethylsilylamide) [(2-PhC$_9$H$_6$)$_2$GdN(SiHMe$_2$)$_2$], 34.2 µmol of dimethylanilinium tetrakis(pentafluorophenyl)borate [Me$_2$NHPhB(C$_6$F$_5$)$_4$], and 1.43 mmol of diisobutylaluminum hydride were provided in a glass container, which was dissolved into 8 mL of toluene, to thereby obtain a catalyst solution. After that, the catalyst solution was taken out from the glovebox and added by 28.2 µmol of gadolinium equivalent to the monomer solution, which was then subjected to polymerization at room temperature for 5 minutes. Thereafter, 30 mL of a toluene solution containing 4.57 g (0.085 mol) of 1,3-butadiene was added while reducing the introduction pressure of ethylene at a rate of 0.2 MPa/min, and then polymerization was further performed for another 60 minutes. Then, the following operation was repeated three times in total: reset the introduction pressure of ethylene to 0.8 MPa and perform polymerization for 5 minutes, then add 30 mL of a toluene solution containing 4.57 g (0.085 mol) of 1,3-butadiene while reducing the introduction pressure of ethylene at a rate of 0.2 MPa/min, and subsequently performing further polymerization for 60 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer B (multiblock copolymer). The yield of the copolymer B thus obtained was 14.00 g.

Example 3

Ethylene was introduced at 0.8 MPa into a 400 mL pressure-resistant grass reactor that had been sufficiently dried, and then 160 mL of a toluene solution containing 9.14 g (0.17 mol) of 1,3-butadiene was added thereto. Meanwhile, in a glovebox under a nitrogen atmosphere, 28.5 µmol of bis(2-phenylindenyl)gadolinium bis(dimethylsilylamide) [(2-PhC$_9$H$_6$)$_2$GdN(SiHMe$_2$)$_2$], 34.2 mmol of dimethylanilinium tetrakis(pentafluorophenyl)borate [Me$_2$NHPhB(C$_6$F$_5$)$_4$], and 1.43 mmol of diisobutylaluminum hydride were provided in a glass container, which was dissolved into 8 mL of toluene, to thereby obtain a catalyst solution. After that, the catalyst solution was taken out from the glovebox and added by 28.2 µmol of gadolinium equivalent to the monomer solution, which was then subjected to polymerization at room temperature for 60 minutes. Thereafter, 60 mL of a toluene solution containing 9.14 g (0.17 mol) of 1,3-butadiene was newly added at a rate of 1.0 ml/min while reducing the introduction pressure of ethylene at a rate of 0.1 MPa/min, and then polymerization was further performed for another 60 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer C (tapered copolymer). The yield of the copolymer C thus obtained was 16.30 g.

Example 4

Firstly, 160 mL of a toluene solution was added to a 400 mL pressure-resistant grass reactor that had been sufficiently dried, and then ethylene was introduced thereto at 0.8 MPa. Meanwhile, in a glovebox under a nitrogen atmosphere, 28.5 µmol of bis(2-phenylindenyl)gadolinium bis(dimethylsilylamide) [(2-PhC$_9$H$_6$)$_2$GdN(SiHMe$_2$)$_2$], 34.2 µmol of dimethylanilinium tetrakis(pentafluorophenyl)borate [Me$_2$NHPhB(C$_6$F$_5$)$_4$], and 1.43 mmol of diisobutylaluminum hydride were provided in a glass container, which was dissolved into 8 mL of toluene, to thereby obtain a catalyst solution. Then, the catalyst solution was taken out from the glovebox and added by 28.2 mmol of gadolinium equivalent to the monomer solution, while adding a toluene solution containing 1,3-butadiene in a continuous manner for 60 minutes at a rate of 0.3 g/min, in 1,3-butadiene equivalent. Thereafter, polymerization was further performed for another 30 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer D (random copolymer). The yield of the copolymer D thus obtained was 15.50 g.

Figure 2:
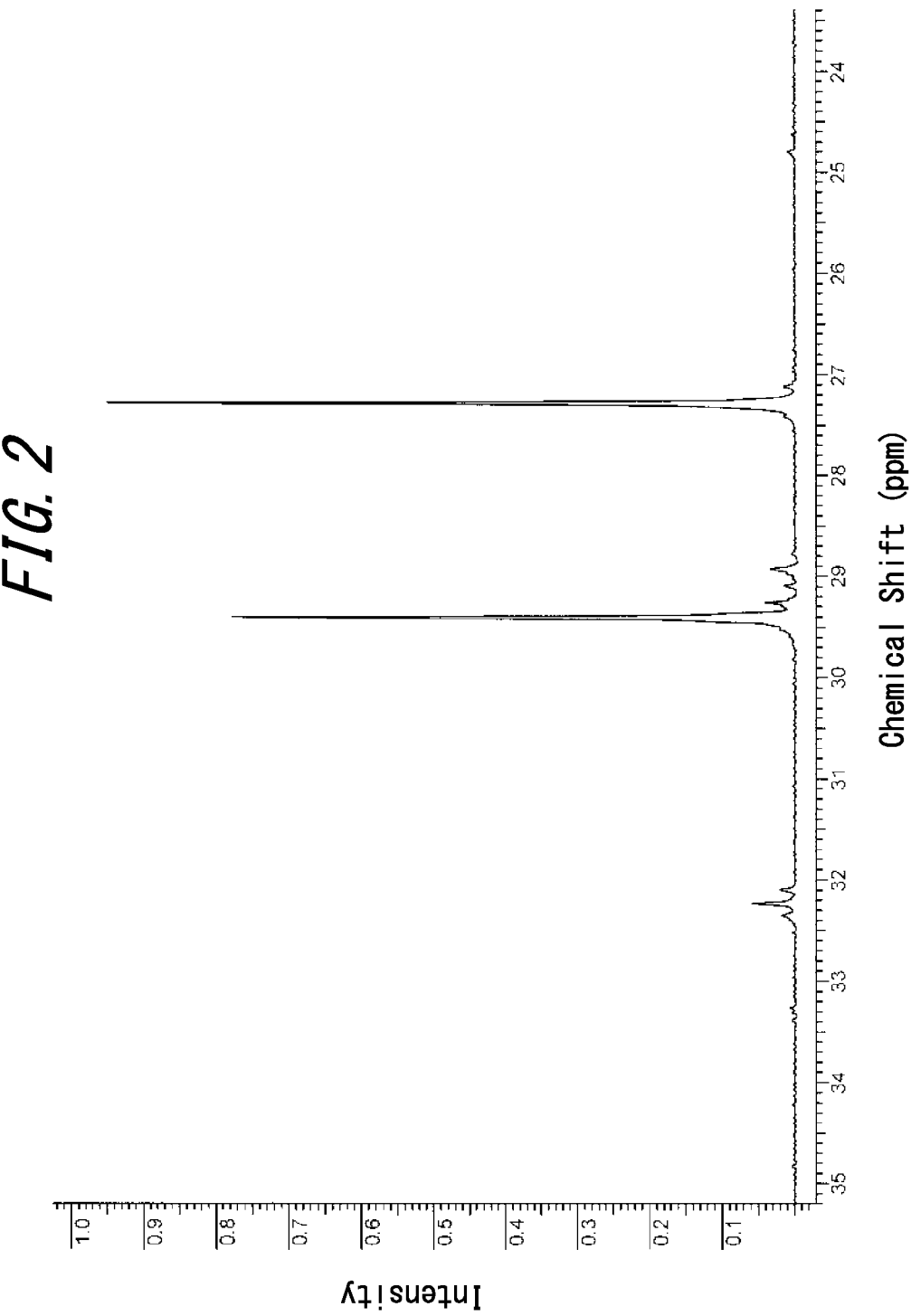
FIG. 2 is a $^{13}$C-NMR spectrum chart of a copolymer C.
Figure 3:
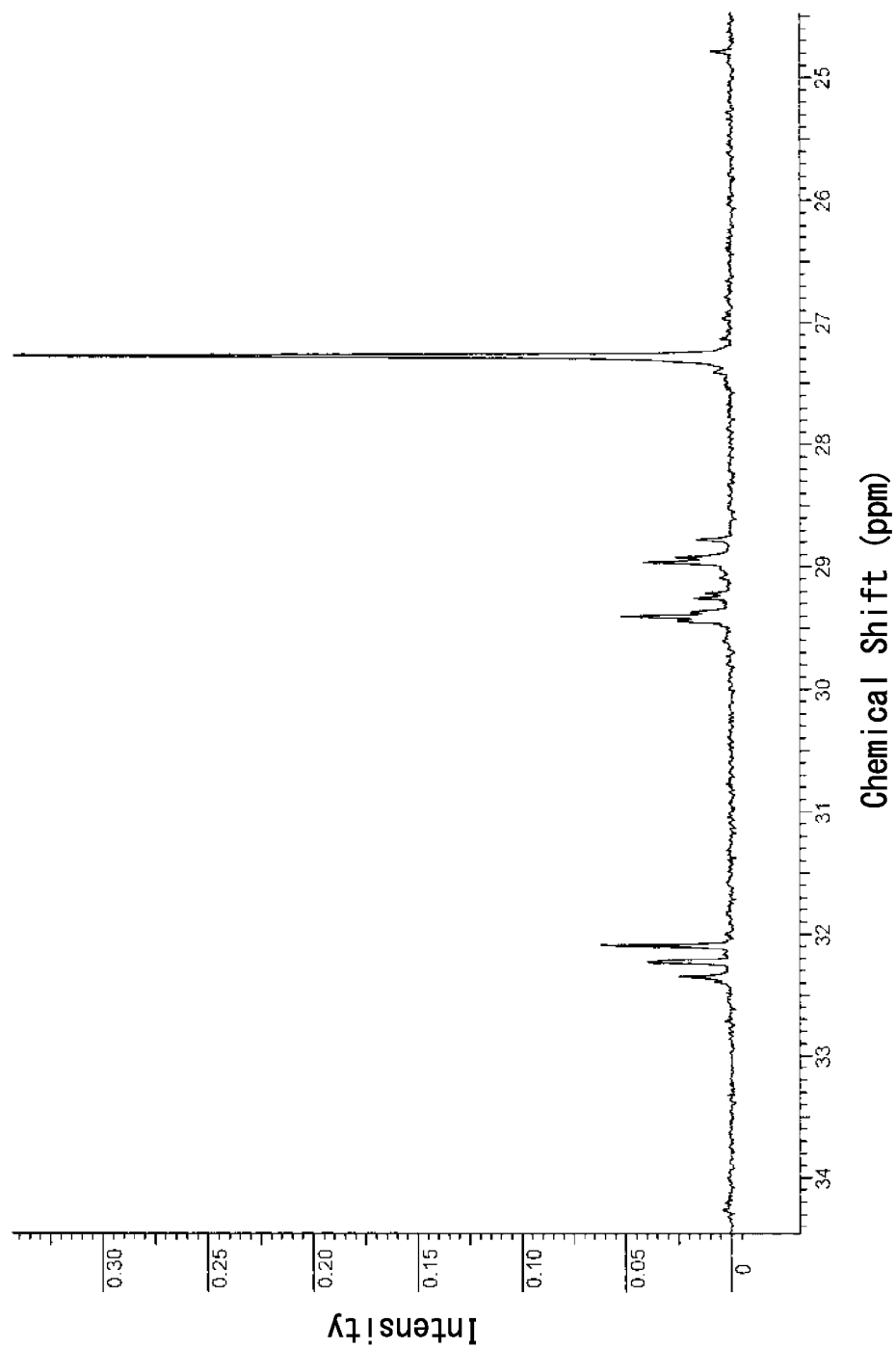
FIG. 3 is a $^{13}$C-NMR spectrum chart of a copolymer D.

The copolymers A to D of Examples 1 to 4 produced as described above were each subjected to measurement and evaluation by the following method so as to investigate the microstructure, the ethylene content, the weight-average molecular weight (Mw), and the molecular weight distribution (Mw/Mn). FIG. 1 is a $^{13}$C-NMR spectrum chart of a copolymer A, FIG. 2 is a $^{13}$C-NMR spectrum chart of a copolymer C, and FIG. 3 is a $^{13}$C-NMR spectrum chart of a copolymer D. In addition, FIG. 4 illustrates a DSC curve of the copolymer A, FIG. 5 illustrates a DSC curve of the copolymer C, and FIG. 6 illustrates a DSC curve of the copolymer D.

Figure 4:
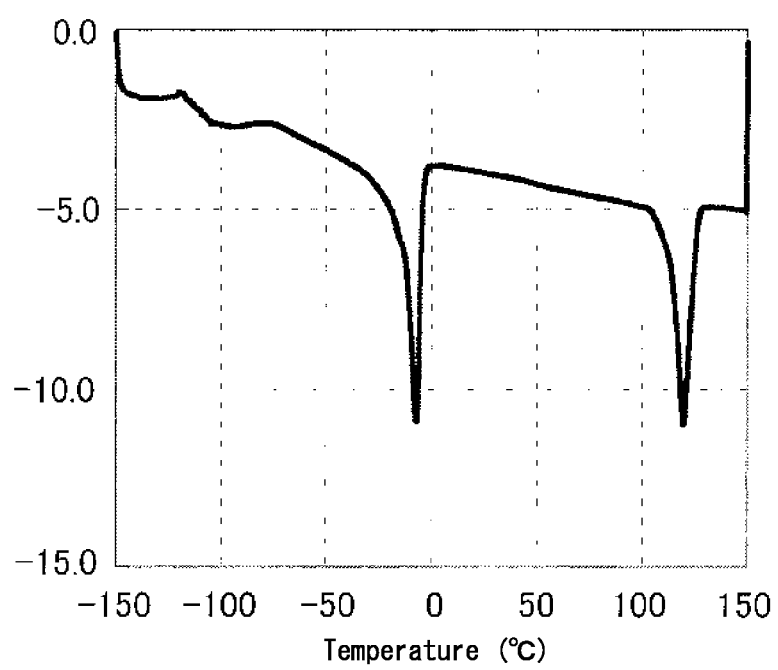
FIG. 4 illustrates a DSC curve of the Copolymer A.
Figure 5:
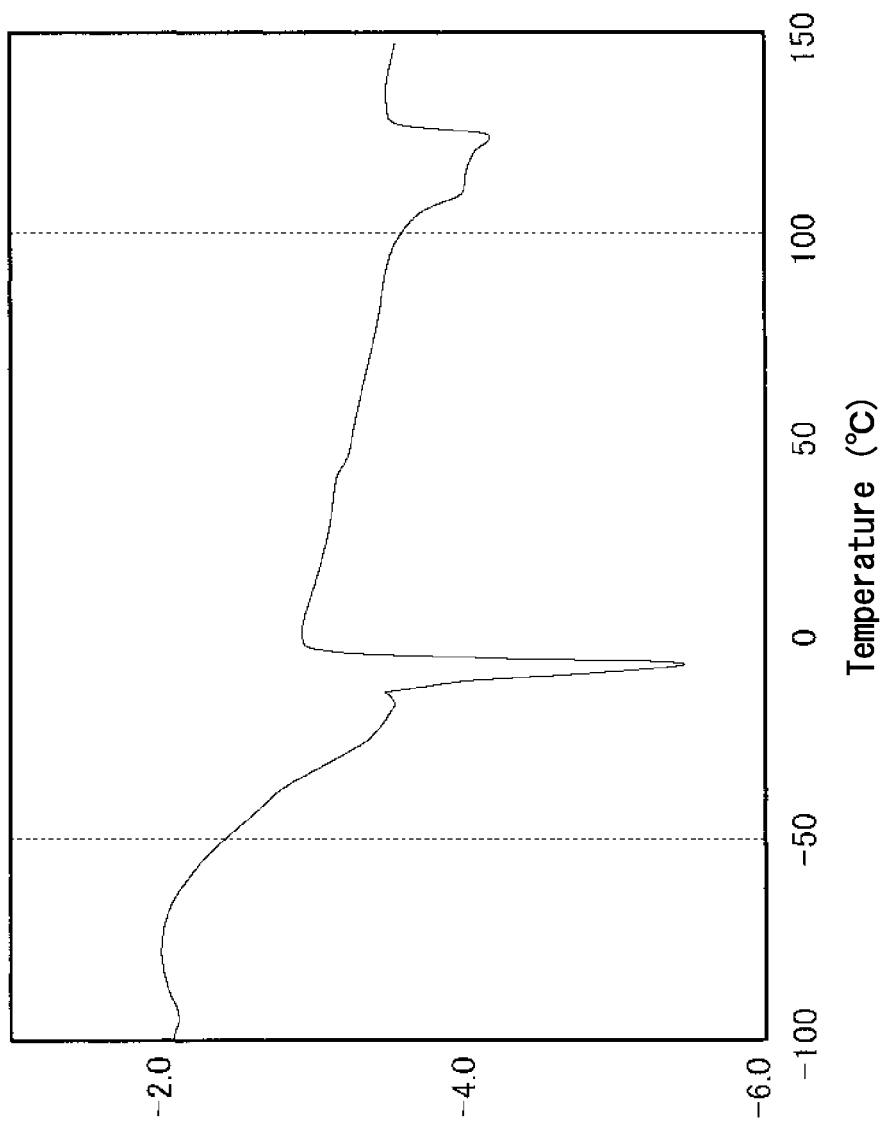
FIG. 5 illustrates a DSC curve of the copolymer C.

In the $^{13}$C-NMR spectrum chart of the copolymer A of FIG. 1, a peak which is derived from an ethylene block sequence is found at 29.4 ppm, while in the DSC curve of the copolymer A of FIG. 4, by means of DSC, a crystallization temperature which is derived from a block sequence composed of a monomeric cis-unit of 1,3-butadiene can be observed near −10° C., and a crystallization temperature which is derived from a block sequence composed of a monomeric unit of ethylene can be observed near 120° C. Accordingly, it can be seen that the copolymer A is a block copolymer of high cis-1,3-butadiene and ethylene. Further, the sequence distribution of the copolymer A was analyzed by applying ozonolysis-GPC measurements disclosed in a document ("Polymer Preprints, Japan, Vol. 42, No. 4, pp. 1347"). A polystyrene equivalent weight-average molecular weight (MW) and molecular weight distribution (Mw/Mn) of each copolymer were obtained through gel permeation chromatography [GPC: HLC-8121GPC/HT (manufactured by Tosoh Corporation), column: two of GPC HT-803 (manufactured by Showa Denko K.K.), detector: differential refractometer (RI)], using monodisperse polystyrene as a reference, at measurement temperature of 140° C.]. The result showed that the total ethylene component contained 80 mass % or more of a block ethylene component, that is, polyethylene component having a number-average molecular weight (Mn) of 1,000 or more, and that the copolymer A was identified as a block copolymer.

Figure 6:
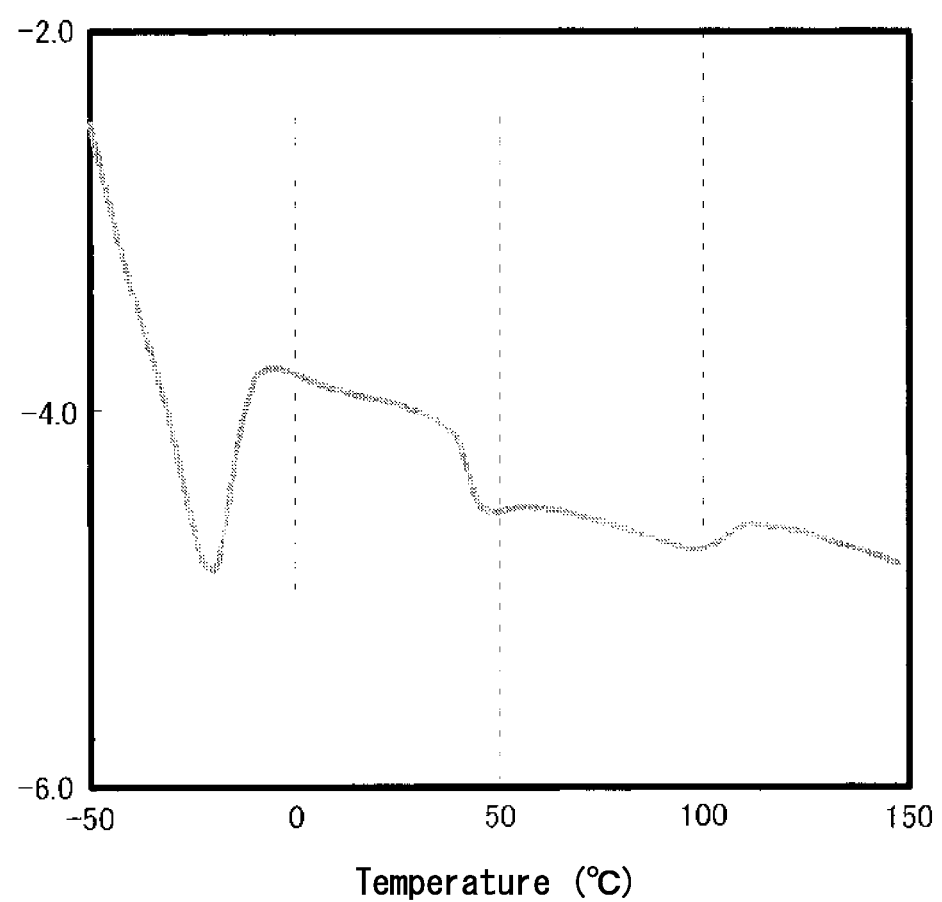
FIG. 6 illustrates a DSC curve of the copolymer D.

In addition, the copolymer B was also identified as a block copolymer of 1,3-butadiene and ethylene by $^{13}$C-NMR, DSC and ozonolysis-high temperature GPC, while the copolymer D was identified as a random copolymer since, as shown in FIG. 6, no clear peak derived from a block sequence of ethylene was identified by DSC and it was determined by ozonolysis-high temperature GPC that there was little polyethylene component having a number average molecular weight (Mn) of 1,000 or more. Further, the DSC curve of the copolymer D of FIG. 5 shows, with respect to a total endothermic peak area derived from the ethylene chain in a temperature range of 40° C. to 140° C., a broad endothermic peak was observed in a temperature range of 40° C. to 120° C., indicating random moieties being formed which includes randomly-arranged monomer units of butadiene and ethylene (including a block of low molecular weight), other than an endothermic peak in a temperature range of 120° C. or above derived from the crystallization temperature of the long-chain block sequence including monomer units of ethylene. Accordingly, it was confirmed that the copolymer C was a tapered copolymer of 1,3-butadiene and ethylene.

(1) Microstructure

The microstructure of the butadiene unit in the copolymer is determined from an integral ratio based on $^1$H-NMR spectrum (1,2-vinyl bond content) and $^{13}$C-NMR spectrum (a ratio of cis-1,4 bond content to trans-1,4 bond content). The calculated values of the cis-1,4 bond content (%) are shown in Table 1.

(2) Ethylene Content

The content (mol %) of the ethylene unit in the copolymer is determined from an integral ratio based on $^1$H-NMR spectrum and $^{13}$C-NMR spectrum.

(3) Weight-Average Molecular Weight (Mw) and Molecular Weight Distribution (Mw/Mn)

A polystyrene equivalent weight-average molecular weight (MW) and a molecular weight distribution (Mw/Mn) of each copolymer were obtained through gel permeation chromatography [GPC: HLC-8121GPC/HT (manufactured by Tosoh Corporation), column: two of GMH$_{HR}$-H(S)HT (manufactured by Tosoh Corporation), detector: a differential refractometer (RI)], using monodisperse polystyrene as a reference. The measurement temperature was 140° C.

(4) DSC Curve

A DSC curve of each copolymer was obtained by differential scanning calorimetry (DSC) according to JIS K7121-1987.

TABLE 1

|  | Example 1 | Example 2 | Example 3 | Example 4 |
| --- | --- | --- | --- | --- |
| copolymer type | A | B | C | D |
| Mw (×10$^3$) | 350 | 283 | 295 | 100 |
| Mw/Mn | 2.2 | 2.8 | 2.5 | 2.9 |
| cis-1,4 bond content (%) | 98 | 97 | 98 | 94 |
| ethylene content (mol %) | 7 | 13 | 15 | 20 |

INDUSTRIAL APPLICABILITY

The present invention provides a method for controlling the chain structure of a copolymer. The disclosed method is capable of controlling the arrangement of monomeric units in a copolymer, and of selectively forming a random copolymer, tapered copolymer, multiblock copolymer and block copolymer.

The invention claimed is:

1. A method for controlling the chain structure of a copolymer of a conjugated diene compound and a non-conjugated olefin, wherein introduction of the conjugated diene compound is controlled in the presence of the non-conjugated olefin and a polymerization catalyst so as to control the chain structure of the copolymer, and wherein the polymerization catalyst includes a metallocene-based composite catalyst represented by the following formula (A):

$$R_a MX_b QY_b \quad (A)$$

wherein R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2.

2. The method for controlling the chain structure of the copolymer according to claim 1, wherein the conjugated diene compound is introduced into a polymerization reaction system in which polymerization of the non-conjugated olefin has been initiated, a polymerization reaction system in which polymerization of the conjugated diene compound and the non-conjugated olefin has been initiated or a polymerization reaction system including a copolymer of the non-conjugated olefin and the conjugated diene compound, in the presence of the non-conjugated olefin and the polymerization catalyst so as to control the chain structure of the copolymer to manufacture a block copolymer, a random copolymer or a tapered copolymer.

3. The method for controlling the chain structure of the copolymer according to claim 2, wherein the conjugated diene compound is a conjugated diene compound having 4 to 8 carbon atoms.

4. The method for controlling the chain structure of the copolymer according to claim 3, wherein the conjugated diene compound is at least one compound selected from a group consisting of 1,3-butadiene and isoprene.

5. The method for controlling the chain structure of the copolymer according to claim 2, wherein the non-conjugated olefin is an acyclic olefin.

6. The method for controlling the chain structure of the copolymer according to claim 5, wherein the acyclic olefin is an α-olefin having 2 to 10 carbon atoms.

7. The method for controlling the chain structure of the copolymer according to claim 6, wherein the α-olefin is at least one compound selected from a group consisting of ethylene, propylene and 1-butene.

8. The method for controlling the chain structure of the copolymer according to claim 2, wherein the amount of the conjugated diene compound to be introduced is controlled so as to control the chain structure of the copolymer.

9. The method for controlling the chain structure of the copolymer according to claim 2, wherein the number of times the conjugated diene compound is introduced is controlled so as to control the chain structure of the copolymer.

* * * * *